United States Patent Office
3,517,718
Patented June 30, 1970

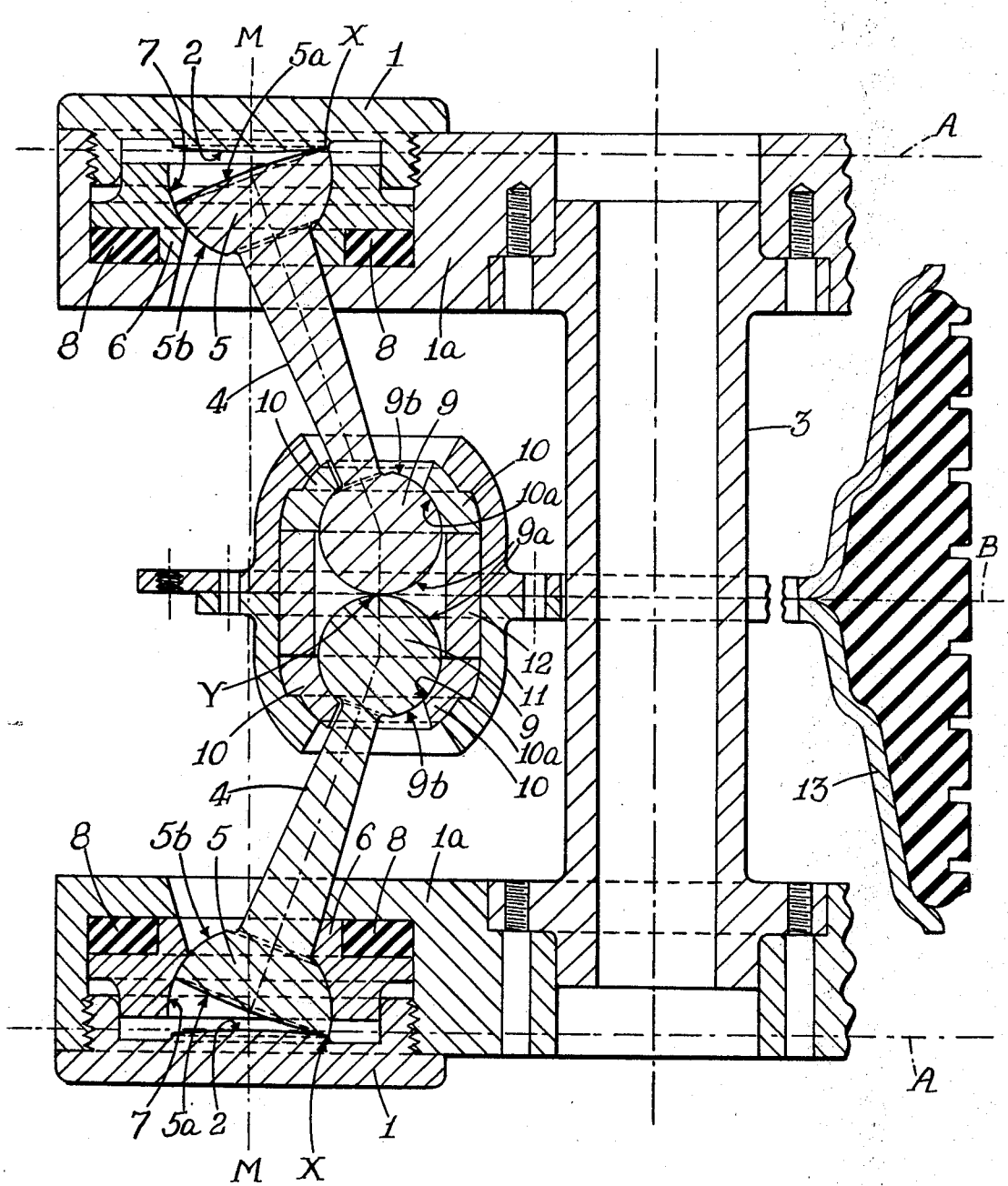

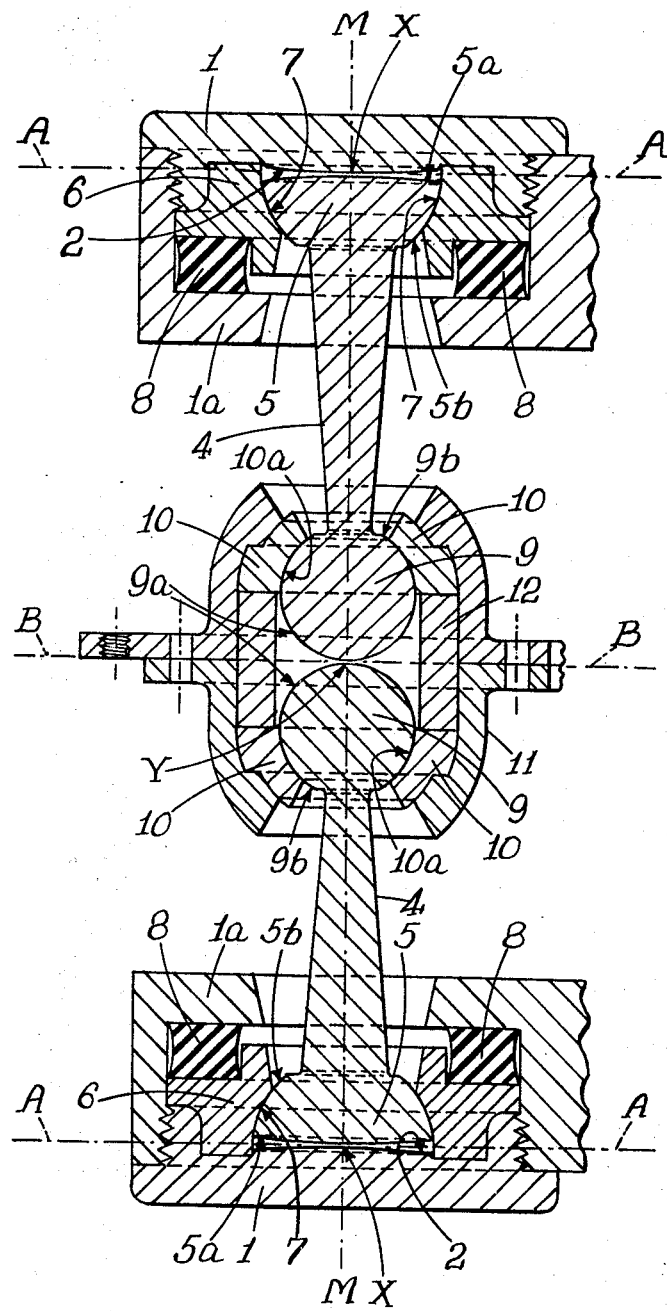

3,517,718
VEHICLE SUSPENSION AND COUPLING THEREFOR
Edmond Eric Johnson, Chingola, Zambia (P.O. Box 207, Umkomaas, Natal, Republic of South Africa)
Filed Dec. 11, 1967, Ser. No. 689,413
Claims priority, application Republic of South Africa, Dec. 22, 1966, 66/7,749
Int. Cl. B60b 9/00, 9/10
U.S. Cl. 152—27                    14 Claims

ABSTRACT OF THE DISCLOSURE

A resilient, self-centering coupling which is particularly suitable for vehicle suspensions. A pair of links are disposed between a pair of convex outer bearing surfaces located in fixed spaced relationship. At their outer ends the links present intermediate convex bearing surfaces co-operating with the outer bearing surfaces, the outer and intermediate bearing surfaces being resiliently retained in co-operating relationship. At their inner ends the links present co-operating convex inner bearing surfaces. The links and the outer bearing surfaces are relatively movable with the contact zones between the two sets of co-operating outer and intermediate bearing surfaces remaining substantially in a pair of substantially parallel outer planes located in fixed spaced relationship transversely to the links and with the contact zone between the co-operating inner bearing surfaces remaining substantially in an inner plane located intermediate the outer planes and substantially parallel thereto. The components are resiliently biased towards a normal position in which the links are located substantially in alignment with one another and substantially at right angles to the outer and inner planes. The links are displaceable out of alignment with one another and away from a right angular relationship to the inner and outer planes.

---

This invention relates to vehicle suspensions and couplings therefor.

It is an object of the present invention to provide a new and improved coupling which has numerous useful applications, such as, for example, in vehicle suspensions. For the purposes of this specification the term "vehicle" is intended to signify not only road vehicles but also aircraft.

According to the invention a coupling includes a pair of convex outer bearing surfaces located in fixed spaced relationship to each other; a pair of links extending towards each other from the outer bearing surfaces; an intermediate convex bearing surface on the outer end of each link and co-operating with the outer bearing surface at that end; and co-operating convex inner bearing surfaces on the inner ends of the links, the links and the outer bearing surfaces being relatively movable with the contact zones between the two sets of co-operating outer and intermediate bearing surfaces remaining substantially in a pair of substantially parallel outer planes located in fixed spaced relationship to each other and with the contact zone between the co-operating inner bearing surfaces remaining substantially in a plane located intermediate the outer planes and substantially parallel thereto.

Each set of co-operating outer and intermediate bearing surfaces may be relatively movable with a sliding and/or rolling action.

The co-operating inner bearing surfaces may also be relatively movable with a sliding and/or rolling action.

Preferably, the intermediate plane containing the contact zone between the two inner bearing surfaces lies midway between the two outer planes containing the two sets of co-operating outer and intermediate bearing surfaces.

The links and the outer bearing surfaces may be movable between a normal position in which the two links are aligned and a displaced position in which the links lie at an angle to each other.

In order to minimize wear, the arrangement may be such that the co-operating outer and intermediate bearing surfaces of each set do not come into positive contact with each other when the component parts are in or near the normal position.

Similarly, the arrangement may be such that the co-operating inner bearing surfaces do not come into positive contact with each other when the component parts are in or near the normal position.

For the purposes of this specification, the term "contact zone" as used above has an extended meaning to signify not only zones in which a pair of co-operating bearing surfaces actually contact each other, but also opposed zones of a pair of co-operating bearing surfaces which have a slight clearance between them.

Separate retaining means may be provided at the outer end of each link for keeping the outer and intermediate bearing surfaces at the outer end of the link in co-operating relationship.

Preferably, each set of outer and intermediate bearing surfaces are resiliently retained in co-operating relationship.

Each link may include at its outer end a head presenting an intermediate bearing surface at its outer end and a spherical guide surface towards its inner end, the retaining means at the outer end of each link presenting a complementary socket rotatably receiving the spherical guide surface of the associated link head.

Preferably, the retaining means at the outer end of each link includes a mounting member fast with the outer bearing surface; a guide member presenting the complementary socket and movable relative to the mounting member in a longitudinal direction relative to the link; and resilient means between the guide member and the mounting member biasing the guide member towards the outer bearing surface.

The two mounting members of the retaining means at the outer ends of the two links may be rigidly connected together.

Additionally, retaining means may be provided at the inner ends of the links for keeping the inner bearing surfaces in co-operating relationship.

The two links may include spherical heads at their inner ends, each such head presenting an inner bearing surface at its outer end and a spherical guide surface at its inner end, the retaining means at the inner bearing surfaces presenting complementary sockets rotatably receiving the spherical guide surfaces of the inner heads of the links.

For resiliently coupling two relatively movable parts together, the retaining means at the inner bearing surfaces may be secured to the one part and the retaining means at the outer ends of the links may be secured to the other part.

A preferred embodiment of the invention will now be described by way of example with reference to the accompanying drawings in which:

FIG. 1 is a fragmentary diagrammatical respresentation of a vehicle suspension in which a wheel is mounted on an axle by means of a coupling according to the invention. The coupling is shown in displaced position.

FIG. 2 is a fragmentary diagrammatical representation of the coupling of FIG. 1 in normal position.

A coupling according to the invention comprises a pair of spaced mounting members 1; a pair of inwardly directed, convex outer bearing surfaces 2 fast with mounting members 1. Mounting members 1 are secured together through wheel axle 3 so that outer bearing surfaces 2 are located in fixed spaced relationship and are movable together with each other and with wheel axle 3.

A pair of links 4 of equal length extend towards each other from outer bearing surfaces 2. Each link 4 is provided with an outer head 5 and an inner head 9. Each outer head 5 presents on its outer end an outwardly directed, convex intermediate bearing surface 5a opposed to and co-operating with the associated outer bearing surface 2. Each outer link head 5 further presents on its inner end an inwardly directed spherical guide surface 5b.

A guide member 6 is provided for each outer link head 5, each guide member 6 being movable relative to the associated mounting member 1 longitudinally relative to links 4 and each guide member 6 further presenting a complementary socket 7 rotatably receiving the spherical guide surface 5b of the associated link head 5. A resilient pad is 8 located between each guide member 6 and retaining portion 1a of the associated mounting member 1, each resilient pad 8 biasing its guide member 6 towards the associated outer bearing surface 2.

Resilient pads 8 are preferably prestressed before they are mounted so that they bias the coupling towards the normal position shown in FIG. 2 in which links 4 are aligned.

Inner link heads 9 are spherical and present opposed and co-operating convex inner bearing surfaces 9a on their outer ends and spherical guide surfaces 9b on their inner ends. A guide member 10 is provided for each inner link head 9.

Each guide member 10 presents a complementary socket 10a rotatably receiving the spherical guide surface 9b of the associated inner link head 9. A retaining casing 11 surrounds the guide members 10 and holds them in position. A tubular spacer 12 is located between guide members 10 to locate them in required spaced relationship.

The arrangement of the coupling and the relative dimensions of the component parts are such that when the coupling is in the normal position of FIG. 2, co-operating bearing inner surfaces 9a have a slight clearance between them under the influence of the outward bias applied to links 4 by resilient pads 8, so that there is no positive contact between them, thereby to minimize wear. The clearance may be sufficient merely to permit the formation of an oil film between inner bearing surfaces 9a. Similarly, in the displaced position of FIG. 1 in which links 4 lie at angle to each other, there is no positive contact between each outer bearing surface 2 and its associated intermediate bearing surface 5a, due to inward pull on links 4 against the action of resilient pads 8.

By comparing FIGS. 1 and 2, it will be seen that each set of co-operating outer and intermediate bearing surfaces 2, 5a as well as the co-operating inner bearing surfaces 9a are relatively movable to permit limited relative movement of the outer bearing surfaces 2 and the links 4 with contact zones X between the two sets of co-operating outer and intermediate bearing surfaces 2, 5a remaining substantially in parallel outer planes A and with contact zones Y between inner bearing surfaces remaining substantially in intermediate plane B located parallel to outer planes A in a position midway therebetween.

In the arrangement shown in FIG. 1, outer bearing surfaces 2 are fast with wheel axle 3. Retaining casing 11 round inner bearing surfaces 9a is fast with a wheel 13 which is movable through 360° about the axis of alignment MM of links 4 with the medial plane of wheel 13 substantially coinciding with intermediate plane B containing the contact zones Y between inner bearing surfaces 9a.

It is believed that by mounting the wheels of a road vehicle with couplings according to the invention, it will be possible to dispense altogether with conventional suspensions, the couplings according to the invention providing suitable and adequate resilience between the wheels and the chassis of the vehicle.

It is believed further that the landing gear of aircraft can be improved by substituting a rigid strut for a conventional oleo leg and mounting one or more wheels on the rigid strut, each such wheel being resiliently mounted on the strut by means of one or more couplings according to the invention so that coupling or couplings provide resilience between the wheel or wheels and an aircraft body on which the strut is mounted. It will be appreciated that the wheels are independently suspended on the rigid strut. It is believed that such a landing gear would be better able to accommodate shock upon landing at high speed, than conventional landing gear.

What I claim:

1. A coupling comprising means defining a pair of opposed convex outer bearing surfaces located in fixed spaced relationship to each other; a pair of links extending towards each other from the outer bearing surfaces; means defining an intermediate convex bearing surface on the outer end of each link, each intermediate bearing surface being located in opposed cooperating relationship to its own outer bearing surface; means defining a convex inner bearing surface on the inner end of each link, the inner bearing surfaces being located in opposed cooperating relationship to each other; means supporting the links and the outer bearing surfaces for limited relative movement with the contact zones between the two sets of cooperating outer and intermediate bearing surfaces remaining substantially in a pair of substantially parallel outer planes located in fixed spaced relationship to each other and with the contact zone between the co-operating inner bearing surfaces remaining substantially in a plane located intermediate the outer planes and substantially parallel thereto.

2. A coupling according to claim 1, wherein the intermediate plane containing the contact zone between the two inner bearing surfaces lies midway between the two outer planes containing the two sets of co-operating outer and intermediate bearing surfaces.

3. A coupling according to claim 1, wherein the links and the outer bearing surfaces are movable between a normal position in which the two links are aligned and a displaced position in which the links lie at an angle to each other.

4. A coupling according to claim 1, said supporting means comprising retaining means at the outer end of each link for keeping the outer and intermediate bearing surfaces at the outer end of the link in co-operating relationship.

5. A coupling according to claim 1, said supporting means comprising retaining means at the inner ends of the links for keeping the inner bearing surfaces in co-operating relationship.

6. A coupling according to claim 3, comprising resilient means at the outer end of each link for keeping the outer and intermediate bearing surfaces at the outer ends of the links in co-operating relationship and resiliently biasing the component parts of the coupling towards the normal position.

7. A coupling according to claim 4, wherein each link includes at its outer end a head presenting an intermediate bearing surface at its outer end and a spherical guide surface towards its inner end, the retaining means at the outer end of each link presenting a complementary socket rotatably receiving the spherical guide surface of the associated link head.

8. A coupling according to claim 5, wherein the two links include spherical heads at their inner ends, each such head presenting an inner bearing surface at its outer end and a spherical guide surface at its inner end, the retaining means at the inner bearing surfaces presenting complementary sockets rotatably receiving the spherical guide surfaces of the inner heads of the links.

9. A coupling as claimed in claim 7, wherein the retaining means at the outer end of each link includes a mounting member fast with the outer bearing surface; a guide member presenting the complementary socket and movable relative to the mounting member in a longitudinal direction relative to the link; and resilient means between the guide member and the mounting member biasing the guide member towards the outer bearing surface.

10. A coupling according to claim 9, wherein the two mounting members of the retaining means at the outer ends of the two links are rigidly connected together.

11. A coupling comprising means defining a pair of opposed convex outer bearing surfaces located in fixed spaced relationship to each other; a pair of links extending towards each other from the outer bearing surfaces; means defining an intermediate convex bearing surface on the outer end of each link, each intermediate bearing surface being located in opposed cooperating relationship to its own outer bearing surface; means defining a convex inner bearing surface on the inner end of each link, the inner bearing surfaces being located in opposed cooperating relationship to each other; means at the outer end of each link and at the inner ends of the links holding the bearing surfaces for limited relative movement between the links and the outer bearing surfaces with the contact zones between the two sets of cooperating outer and intermediate bearing surfaces remaining substantially in a pair of substantially parallel outer planes located in fixed spaced relationship to each other and with the contact zone between the cooperating inner bearing surfaces remaining substantially in a plane located intermediate the outer planes and substantially parallel thereto; and control means at the outer end of each link resiliently urging each intermediate bearing surface towards contact with its outer bearing surface and resiliently biasing the links towards a normal position in which they are aligned.

12. A coupling comprising means defining a pair of opposed convex outer bearing surfaces; means rigidly connecting the outer bearing surfaces together in fixed spaced relationship; a pair of links extending towards each other from the outer bearing surfaces; an outer head on the outer end of each link; a convex intermediate bearing surface on the outer end of each outer link head located in opposed cooperating relationship to the associated outer bearing surface; a spherical guide surface on the inner end of each outer link head; an outer guide member at the outer end of each link presenting a complementary socket rotatably receiving the spherical guide surface of the associated outer link head; means supporting each guide member for movement relative to the associated outer bearing member in a longitudinal direction relative to the link; a head on the inner end of each link; a convex inner bearing surface on the outer end of each inner link head, the inner bearing surfaces being located in opposed cooperating relationship to each other; a spherical guide surface on the inner end of each inner link head; inner guide means presenting complementary sockets rotatably receiving the spherical guide surfaces on the inner link heads and operative to retain the inner bearing surfaces in cooperating relationship; and resilient means at the outer end of each link biasing the associated outer guide member towards the outer bearing surface to urge the links towards a normal position in which they are aligned, but permitting limited relative movement between the links and the outer bearing surfaces, with the contact zones between the two sets of cooperating outer and intermediate bearing surfaces remaining substantially in a pair of substantially parallel outer planes located in fixed spaced relationship to each other and with the contact zone between the cooperating inner bearing surfaces remaining substantially in a plane located intermediate the outer planes and substantially parallel thereto.

13. A coupling as claimed in claim 12, including a mounting member at the outer end of each link fast with the associated outer bearing surface and movably receiving the associated outer guide member; and retaining means fast with each mounting member, the associated resilient means being located between the retaining means and the guide member.

14. A vehicle suspension comprising means defining a pair of opposed convex outer bearing surfaces connected in fixed spaced relationship relative to each other to one member of a pair of relatively movable members comprising a wheel rim and a wheel axle; a pair of links extending towards each other from the outer bearing surfaces; means defining an intermediate convex bearing surface on the outer end of each link, each intermediate bearing surface being located in opposed cooperating relationship to its own outer bearing surface; means defining a convex inner bearing surface on the inner end of each link, the inner bearing surfaces being located in opposed cooperating relationship to each other; means at the inner ends of the links operative to retain the inner bearing surfaces in cooperating relationship and connected to the other member of the pair of relatively movable members; retaining means at the outer end of each link operative to hold each set of outer and intermediate bearing surfaces in cooperating relationship, the inner and outer retaining means holding the bearing surfaces for limited relative movement of the links and the outer bearing surfaces with the contact zones between the two sets of cooperating outer and intermediate bearing surfaces remaining substantially in a pair of substantially parallel outer planes located in fixed spaced relationship to each other and with the contact zone between the cooperating inner bearing surfaces remaining substantially in a plane located intermediate the outer planes and substantially parallel thereto; and control means at the outer end of each link resiliently urging each intermediate bearing surface towards contact with its outer bearing surface and resiliently biasing the links towards a normal position in which they are aligned.

References Cited

UNITED STATES PATENTS

| 2,389,430 | 11/1945 | Hatos | 152—21 |
| 3,405,540 | 10/1968 | Johnson | 152—21 |

FOREIGN PATENTS

| 87,080 | 1921 | Germany. |

ARTHUR L. LA POINT, Primary Examiner

C. B. LYON, Assistant Examiner

U.S. Cl. X.R.

152—40